United States Patent
Bowen et al.

[11] Patent Number: 6,129,416
[45] Date of Patent: Oct. 10, 2000

[54] SHADE FOR CHILD SEAT

[76] Inventors: Cynthia L. Bowen; Walter Lee Bowen, both of 129 Midtown La., Washington, N.C. 27889

[21] Appl. No.: 09/383,469

[22] Filed: Aug. 26, 1999

[51] Int. Cl.[7] .................................................. A47C 7/62
[52] U.S. Cl. ................................ 297/184.13; 160/368.1; 160/351; 297/184.1
[58] Field of Search ................................ 160/351, 368.1, 160/370.21, 370.23; 135/15.1, 19, 90, 117; 248/104; 297/184.13, 184.1; 296/97.9

[56] References Cited

U.S. PATENT DOCUMENTS

| | | | |
|---|---|---|---|
| 2,457,972 | 1/1949 | Bailey . | |
| 2,590,383 | 3/1952 | Dean | 248/104 |
| 2,907,539 | 10/1959 | Vardan | 248/104 |
| 3,861,410 | 1/1975 | Cognet . | |
| 3,954,240 | 5/1976 | Schmidt, III et al. | 248/104 |
| 4,482,117 | 11/1984 | Besek, Jr. . | |
| 4,616,795 | 10/1986 | Bender . | |
| 4,784,433 | 11/1988 | Purnell-Ayres . | |
| 4,785,838 | 11/1988 | Negahdari . | |
| 4,813,739 | 3/1989 | Miller | 297/184.13 |
| 4,865,380 | 9/1989 | Heitzman-Powell et al. | 297/184.13 |
| 4,979,707 | 12/1990 | McErlean | 248/104 |
| 4,989,891 | 2/1991 | Huang . | |
| 5,033,528 | 7/1991 | Volcani . | |
| 5,301,999 | 4/1994 | Thompson et al. | 297/184.13 |
| 5,333,665 | 8/1994 | Safar | 160/351 |
| 5,382,074 | 1/1995 | Pietra . | |
| 5,397,268 | 3/1995 | Chang et al. | 297/184.1 |
| 5,542,732 | 8/1996 | Pollman . | |
| 5,823,486 | 10/1998 | Smith et al. | 248/104 |
| 5,848,628 | 12/1998 | Badalamenti | 160/38 |

FOREIGN PATENT DOCUMENTS 2021259  1/1992  Canada ............................... 135/15.1

*Primary Examiner*—Blair M. Johnson
*Attorney, Agent, or Firm*—Coats & Bennett, PLLC

[57] ABSTRACT

A device for shading a child from sunlight while positioned in a child seat. The device includes a visor shaped for shielding the child from the sun. A bendable support arm is used for mounting and adjusting the visor. The support arm includes an interior member that is pliable for adjusting the orientation of said shield relative to the seat, and a protective outer member extending around the interior member to prevent contact of the interior member by the child.

11 Claims, 2 Drawing Sheets

SHADE FOR CHILD SEAT

FIELD OF THE INVENTION

The present invention is directed to a selectively adjustable shade that allows a protective visor to be variably positioned over a child resting in a child seat.

BACKGROUND OF THE INVENTION

Baby strollers, cribs, car seats, and other like devices (collectively, "child seats") are often used in areas subject to sunlight. It is important that a child be protected from the sunlight and not exposed to harmful UV rays. Additionally, a child exposed to sunlight may become over-heated which is uncomfortable and may be dangerous in extreme conditions.

Several previous child seat devices have included retractable canopies and other more intricate mechanisms that have a variety of moving parts. These moving parts and intricate mechanisms are difficult to protect, or make "child-proof" because they must interrelate or mesh together to effectively operative. Making them safe for a child often requires the device be effectively disabled thereby taking away their utility. These mechanisms also add a large amount of bulk to the seat adding weight that makes them more difficult to carry and requiring more storage space when not in use.

Another drawback of previous designs is their inability to be adjustable depending upon the specific circumstances. Typical shade mechanisms can either be completely deployed or completely retracted, with very little variability in-between. If a child riding in the child seat becomes uncomfortable and begins to fuss because of the shade, there is very little a parent or supervisor can do to adjust the mechanism. Additionally, these shade mechanisms are often cumbersome to adjust and may require that the child be removed from the seat.

Typically, different seat devices require separate shade mechanisms. By way of example, a car seat requires a separate mechanism than a crib which requires a separate mechanism than a stroller. This requires duplicate equipment be purchased for substantially the same task. Mechanisms that do provide for removal and attachment to various seating devices are often ineffective as they are either difficult to properly attach, require several fasteners such as screws or bolts that are easily lost, or once attached do not provide for adequate sun shading.

Thus, there remains a need for a shade mechanism that may be attached to any type of child seat and is easily adjustable to a variety of orientations thereby increasing the comfort of the child riding in the seat and also making it easier for the person supervising the child.

SUMMARY OF THE INVENTION

The present invention is directed to a shade mechanism that attaches to a child seat. The mechanism can be attached to any type of child seat and is easily adjustable to providing shading under a variety of circumstances. The mechanism includes a bendable support arm preferably having an interior member and a protective outer member. The support arm is elongated and may have a variety of shapes and dimensions depending upon the specific parameters. A first end of the support arm is deformable for wrapping around the child seat for mounting the shade mechanism thereto. A visor is attached to the second end of the support arm for shading the child. The user wraps the first end of the support arm around the child seat to secure the shade mechanism. The support arm is then formed and adjusted to position the visor over the child. The interior member of the support arm is bendable for forming a variety of shapes and, once bent, maintains the bent position. Once attached to the child seat, the support arm may be adjusted simply by bending the support arm. The first end of the support arm may be unwrapped and the mechanism attached to a different child seat or other device.

DETAILED DESCRIPTION OF THE PREFERRED EMBODIMENTS

Figure 1:
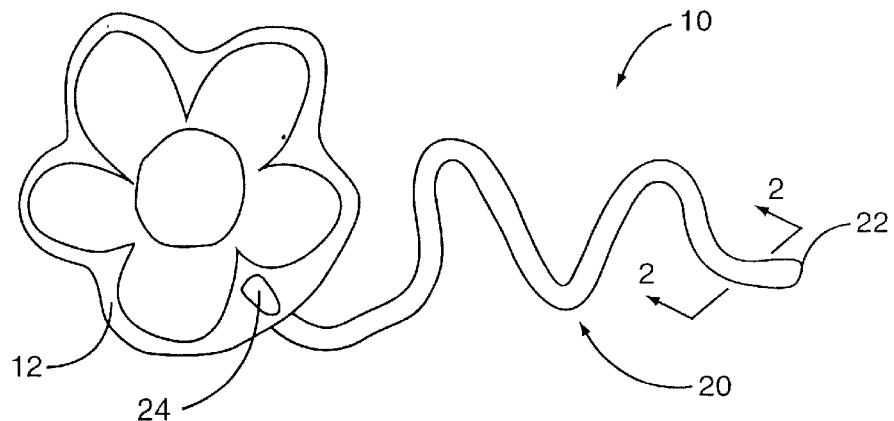
FIG. 1 is a side view illustrating the shade mechanism of the present invention.

Referring now to the drawings in general and FIG. 1 in particular, it will be understood that the illustrations are for the purpose of describing a preferred embodiment of the invention and are not intended to limit the invention thereto. As illustrated in FIG. 1, a shade mechanism, generally designated 10, is shown constructed according to the present invention. The mechanism includes a support arm 20 and a visor 12 attached to one end of the support arm 20. The present invention is intended for use with a child seat which includes a stroller, car seats, cribs, etc., and like items in which the child is sitting or laying in a confined area.

Figure 2:
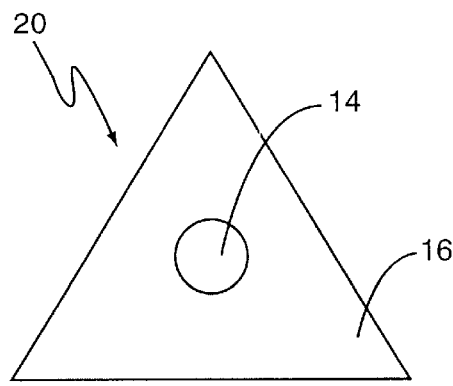
FIG. 2 is a cross-sectional view cut across line 2—2 of FIG. 1 and illustrating the inner and outer members of the support arm.
Figure 4:
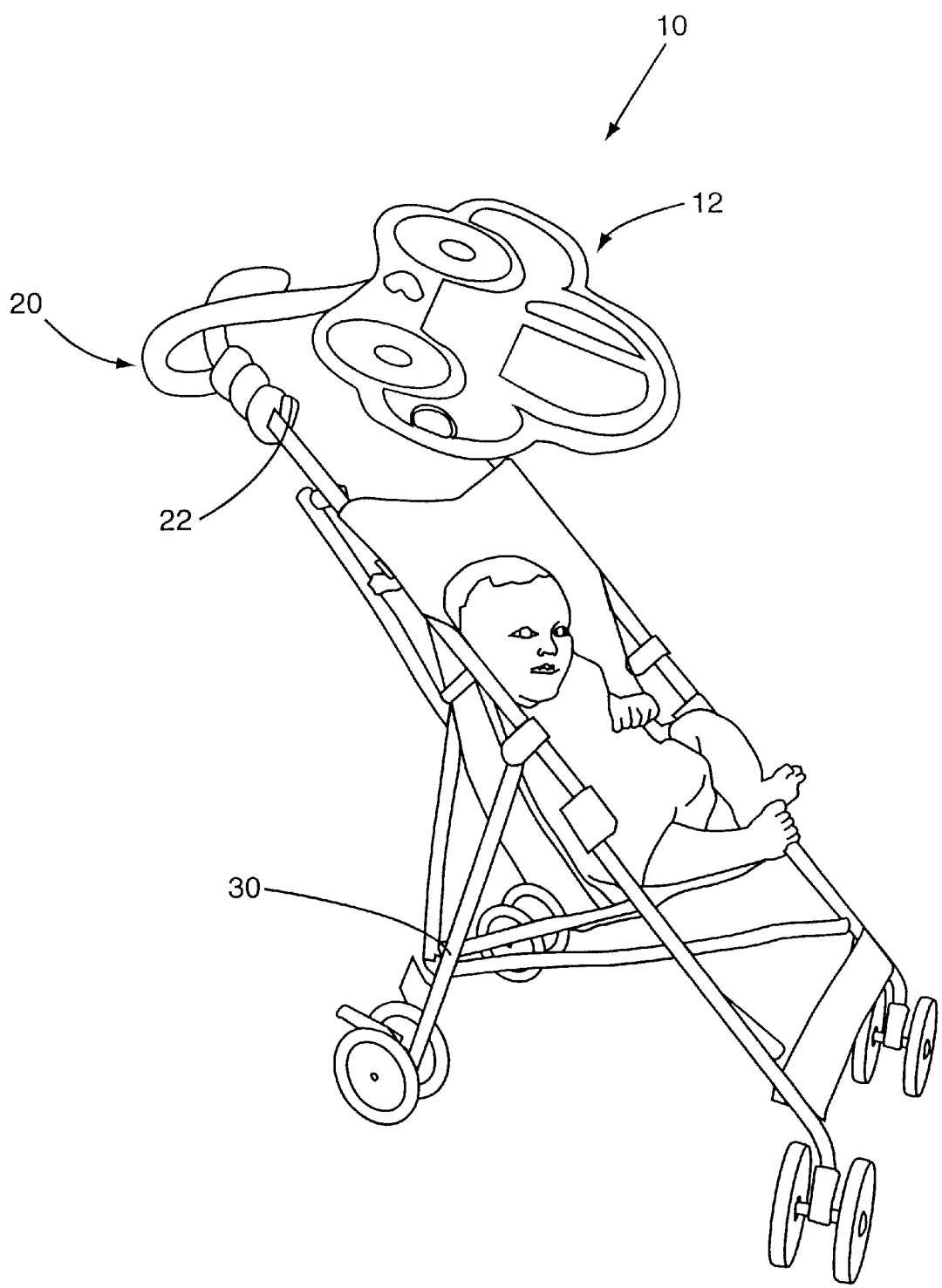
FIG. 4 is a perspective view of the present invention attached to a child seat.

As illustrated in FIG. 4, the support arm 20 extends between the child seat 30 and the visor 12 and may have a variety of lengths depending upon the specific application. FIG. 2 illustrates a cross-sectional view illustrating the support arm 20. An interior member 14 extends through the support arm providing mechanical strength for maintaining the visor 12. The interior member 14 is formable allowing for the user to bend and shape the support arm to the desired position. The interior member 14 may be selected from a wide variety of relatively stiff, but pliable materials, such as thin steel rods, aluminum rods, copper rods, and the like. In one preferred embodiment, the interior member 14 is constructed of aluminum wire having a diameter of 0.162 inches and an overall length of twenty-four to thirty-six inches, preferably thirty inches.

The outer member 16 provides a protective covering around the interior member 14 and is bendable and formable to conform to the shape of the interior member. The outer member 16 is preferably constructed of a soft material that provides for handling by a child or the child's supervisor and may have a variety of cross-sectional shapes. By way of example, FIG. 1 illustrates the support arm having a triangular support arm and FIG. 4 illustrates a substantially circular cross-sectional shape. In one embodiment, the outer member 16 is a foam material such as polyurethane, polyethylene, vinyl, vinyl-nitrile, or a blend thereof. In an alternative embodiment, the outer member 16 is a cloth fabric that extends around the interior member 14.

Figure 3:
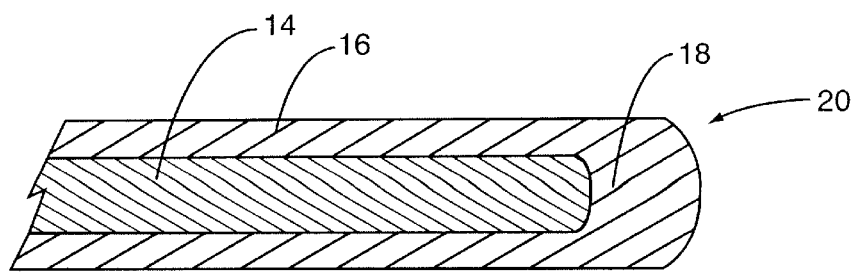
FIG. 3 is a cut-away side view illustrating the positioning of the inner member within the support arm.

The interior member 14 is positioned within the outer member 16. FIG. 2 illustrates the outer member surrounding the interior member 16. Preferably, the outer member 16 extends around the first and second ends of the support arm 20 to protect the child and supervisor from contacting the potentially sharp or abrasive end of the interior member 14. FIG. 3 illustrates an end portion 18 of the outer member extending around the end of the interior member 14.

The visor 12 functions to shield the child from the sun. Preferably, the visor is opaque to completely block all sunlight. However, it may be constructed of a screen or other light-filtering material which filters harmful UV rays from the child. The visor may be shaped to represent an object, such as a car (as illustrated in FIG. 4), or a flower (as illustrated in FIG. 1), or an animal, or an insect, or a hot air balloon, or the like. One or both sides of the visor may be illustrated to further identify the object providing for an aesthetically pleasing appearance for persons observing the shade mechanism and also provide amusement for the child.

FIG. 4 illustrates the shade mechanism attached to a child seat 30. The first end of the support arm 20 is wrapped around the seat handle to maintain the mechanism without slippage. The second end 24 of the support arm 20 attaches to the visor 12. In one embodiment, the overall length of the support arm is about thirty inches. In the embodiment illustrated in FIG. 4, the visor 12 includes at least one aperture for connecting the support arm 20 and visor 12. However, it is understood that the support arm 20 and the visor 12 may be joined by other means known in the art, such as by sewing, by rivets, by glue, and the like.

The flexibility and formability of the support arm 20 provides for positioning the visor 12 as needed and may further be positioned away from the child while still being attached to the child seat 30. The support arm 20 may further be unwrapped and reattached to another child seat 30 and does not require any types of special mounting or brackets.

In the foregoing description, like reference characters designate like or corresponding parts throughout the Figures. Also in the foregoing description, terms such as "forward", "backward", "left", "right", "upwardly", "downwardly", and the like are words of convenience and are not to be construed as limiting terms. Certain modifications and improvements will occur to those skilled in the art upon a reading of the foregoing description. For example, the present invention may also be applicable to attaching other items to a child seat such as toys, bottle, or other like item. Also, the support arm 20 may be constructed of a single member, instead of separate interior and outer members. This unitary embodiment should require that the outer surface of the single member be safe for a child to touch. It should be understood that all such modifications and improvements have been deleted herein for the sake of conciseness and readability but are properly within the scope of the following claims.

What is claimed is:

1. A child seat sunshade assembly, comprising:
   a) a child seat;
   b) a substantially planar visor having first and second sides and having an aperture therein connecting said first side to said second side, said visor disposed to at least partially shield an occupant of said child seat from sunlight;
   c) a manually bendable arm having an unthreaded distal end portion, an unthreaded proximal end portion, and a mid portion, each having a stiffness, said arm attached to said visor by said distal end portion extending through said aperture of said visor from said first side to said second side, said proximal end portion wrapped around a portion of said child seat, said arm adapted to support said visor in a cantilevered fashion from said child seat in a plurality of positions, said arm further adapted for repeated manual attachment and detachment on said child seat without tools; and
   d) said arm including a bendable interior member providing for at least the majority of the stiffness of said arm portions and a distinct protective outer member enclosing said interior member.

2. The device of claim 1 wherein said visor is substantially rigid.

3. The device of claim 1 wherein said first and second sides each include indicia.

4. The device of claim 3, wherein said visor is shaped in the form of a car and said indicia further identifies said car.

5. The device of claim 3, wherein said visor is shaped in the form of a flower and said indicia further identifies said flower.

6. The device of claim 3, wherein said visor is shaped in the form of an animal and said indicia further identifies said animal.

7. The device of claim 3, wherein said visor is shaped in the form of a balloon and said indicia further identifies said balloon.

8. The device of claim 1, wherein said visor is opaque.

9. The device of claim 1, wherein said outer member is a foam material selected from the group consisting of polyurethane, polyethylene, vinyl, vinyl-nitrile, and blends thereof.

10. The device of claim 1, wherein said outer member is a foam material selected from the group consisting of polyurethane and polyethylene.

11. The device of claim 1, wherein said outer member is a fabric material.

* * * * *